(12) United States Patent
Han et al.

(10) Patent No.: US 11,042,582 B2
(45) Date of Patent: Jun. 22, 2021

(54) METHOD AND DEVICE FOR CATEGORIZING MULTIMEDIA RESOURCES

(71) Applicant: YOUKU INTERNET TECHNOLOGY (BEIJING) CO., LTD., Beijing (CN)

(72) Inventors: Diyang Han, Beijing (CN); Yi Fang, Beijing (CN); Fei Hong, Beijing (CN); Jiang Chang, Beijing (CN)

(73) Assignee: Alibaba Group Holding Limited

( * ) Notice: Subject to any disclaimer, the term of this patent is extended or adjusted under 35 U.S.C. 154(b) by 306 days.

(21) Appl. No.: 15/909,092

(22) Filed: Mar. 1, 2018

(65) Prior Publication Data
US 2019/0272330 A1 Sep. 5, 2019
US 2021/0026925 A9 Jan. 28, 2021

(30) Foreign Application Priority Data
Mar. 2, 2017 (CN) .......................... 201710121020

(51) Int. Cl.
*G06F 16/41* (2019.01)
*G06F 7/08* (2006.01)
(Continued)

(52) U.S. Cl.
CPC ............... *G06F 16/41* (2019.01); *G06F 7/08* (2013.01); *G06F 16/44* (2019.01); *G06F 3/04817* (2013.01)

(58) Field of Classification Search
None
See application file for complete search history.

(56) References Cited

U.S. PATENT DOCUMENTS

2012/0254301 A1* 10/2012 Fiero .................... G06F 16/438
709/203
2014/0004489 A1* 1/2014 Kim ....................... G09B 19/00
434/236
(Continued)

FOREIGN PATENT DOCUMENTS

CN 102880712 A 1/2013
CN 102880712 A 1/2013
(Continued)

OTHER PUBLICATIONS

Machine Translation of Chinese Office Action dated Mar. 28, 2019 for Chinese aapplication No. 201710121020.8,. a counterpart foreign application of U.S. Appl. No. 15/909,092. 12 pages.
(Continued)

*Primary Examiner* — Kim T Nguyen
(74) *Attorney, Agent, or Firm* — Lee & Hayes, P.C.

(57) ABSTRACT

The present disclosure relates to a method and a device for categorizing multimedia resources. The method includes: counting the numbers of icons for respective types of icons input by a user for a multimedia resource; and determining a category to which the multimedia resource belongs according to the numbers of the respective types of icons input for the multimedia resource. The method and device for categorizing multimedia resources according to the present disclosure can take respective types of icons input by the user for the multimedia resources into consideration when categorizing the multimedia resources, thereby improving the accuracy of the categorization of the multimedia resources.

19 Claims, 5 Drawing Sheets

---

S101
counting numbers of icons for respective types of icons input by a user for a multimedia resource S102
determining a category the multimedia resource belongs to according to the numbers of the respective types of icons input for the multimedia resource

(51) Int. Cl.
   *G06F 16/44* (2019.01)
   *G06F 3/0481* (2013.01)

(56) References Cited

U.S. PATENT DOCUMENTS

| | | |
|---|---|---|
| 2014/0007149 A1 | 1/2014 | Huang et al. |
| 2014/0163969 A1 | 6/2014 | Chattopadhyay |
| 2014/0282633 A1* | 9/2014 | Fiero .................. H04N 21/4782 725/1 |
| 2015/0205580 A1 | 7/2015 | Tan et al. |
| 2016/0050389 A1* | 2/2016 | Fiero .................. H04L 12/1822 348/14.07 |
| 2016/0055183 A1* | 2/2016 | Fiero ................ H04N 21/23109 707/803 |
| 2016/0294885 A1* | 10/2016 | Fiero .................. G06Q 30/0241 |
| 2017/0126611 A1* | 5/2017 | Rajan ..................... H04L 67/306 |
| 2017/0255618 A1* | 9/2017 | Fiero ....................... G06Q 30/02 |
| 2017/0357647 A1* | 12/2017 | Fiero ....................... G06F 16/27 |

FOREIGN PATENT DOCUMENTS

| | | |
|---|---|---|
| CN | 103530788 A | 1/2014 |
| CN | 104035982 A | 9/2014 |
| CN | 104410911 A | 3/2015 |
| CN | 105868686 | 8/2016 |
| CN | 106294830 A | 1/2017 |
| CN | 106326391 A | 1/2017 |
| CN | 106951137 A | 7/2017 |

OTHER PUBLICATIONS

Chinese Search Report dated Mar. 20, 2019 for CN Application No. 201710121020.8, 2 pages.

* cited by examiner

METHOD AND DEVICE FOR CATEGORIZING MULTIMEDIA RESOURCES

CROSS-REFERENCE TO RELATED APPLICATION

The present application is based upon and claims the benefit of a priority of Chinese patent application No. 201710121020.8, filed on Mar. 2, 2017, the entirety of which is incorporated herein by reference.

TECHNICAL FIELD

The present disclosure relates to the technical field of multimedia, in particular, relates to a method and a device for categorizing multimedia resources.

BACKGROUND

Video websites usually categorizes videos, to display under a category the information of videos belonging to that category. For example, when a user clicks on the category of comedy movies, information of various videos under the category of comedy movies will be displayed in the associated interface, wherein, the information of the videos may include the titles, the labels and/or the posters of the videos and the likes. For example, the videos may usually be categorized according to the titles and/or the labels thereof, with relatively little information being taken into consideration, resulting in a relatively low accuracy of the video categorization.

SUMMARY

In one aspect, in general, the present disclosure describes a method and a device for categorizing multimedia resources, so as to improve the accuracy of the categorization of multimedia resources.

In another aspect, in general, the present disclosure describes a method for categorizing a multimedia resource, comprising: counting numbers of icons for respective types of icons input by a user for the multimedia resource; and determining a category to which the multimedia resource belongs according to the numbers of the respective types of icons input for the multimedia resource.

In another aspect, in general, the present disclosure describes a device for categorizing a multimedia resource, comprising: a first counter configured to count numbers of icons for respective types of icons input by a user for the multimedia resource; and a first determiner configured to determine a category to which the multimedia resource belongs according to the numbers of the respective types of icons input for the multimedia resource.

In another aspect, in general, the present disclosure describes a device for categorizing a multimedia resource, comprising: a processor; a memory storing computer-readable instructions that, when executed by the processor, cause the processor to: count numbers of icons for respective types of icons input by a user for the multimedia resource; and determine a category to which the multimedia resource belongs according to the numbers of the respective types of icons input for the multimedia resource.

In another aspect, in general, the present disclosure describes a non-volatile computer readable storage medium including instructions that causes a terminal and/or server to perform the above method when executed by a processor of the terminal and/or server.

Aspects may have one or more of the following advantages. The categorization of a multimedia resource can be performed based at least in part on information obtained by interactions between a server device categorizing the multimedia resource and client devices, as described in more detail herein. Thus, the technological problem addressed herein is particular to the interactions between such client and server devices, such as those that occur on the Internet. For example, the method and the device for categorizing multimedia resources according to the present disclosure determines the category to which the multimedia resource belongs by counting the numbers of icons for respective types of icons input by a user of a client device for the multimedia resource and according to the numbers of the respective types of icons input for the multimedia resource. Thus, the respective types of icons input by the user for the multimedia resource can be taken into account when categorizing the multimedia resource, thereby improving the accuracy of the categorization of the multimedia resource.

Other features and aspects of the present disclosure will become apparent from the following descriptions on exemplary embodiments with reference to the drawings.

BRIEF DESCRIPTION OF THE DRAWINGS

The drawings are incorporated in and constitute part of the specification, illustrate the exemplary embodiments, features and aspects of the present disclosure together with the description, and serve to explain the principles of the present disclosure.

DETAILED DESCRIPTION

Figure 1:
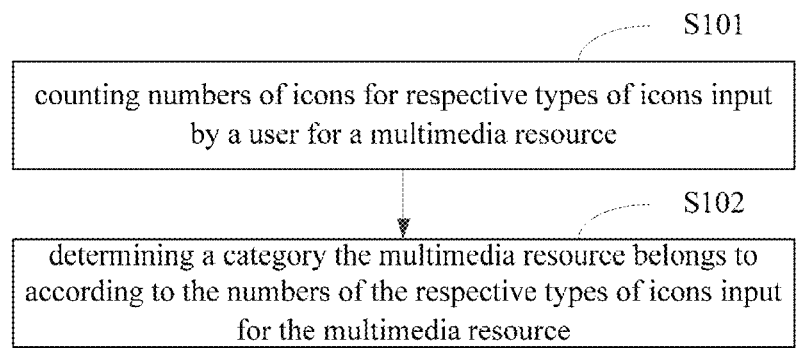
FIG. 1 is a flow chart of the method for categorizing multimedia resources according to an embodiment of the present disclosure.

Various exemplary embodiments, features and aspects of the present disclosure will be described in detail with reference to the drawings. The same reference numerals in the drawings represent elements having the same or similar functions. Although various aspects of the embodiments are shown in the drawings, the drawings are not necessarily drawn in scale, unless otherwise specified.

Herein the term "exemplary" means "being used as an instance or embodiment, or being explanatory". Any "exemplary" embodiment given here should not be necessarily construed as being superior to or better than other embodiments.

Furthermore, numerous details are given in the following embodiments for a better explanation to the present disclosure. One skilled in the art may understand that the present disclosure can be implemented without some of the details. In some embodiments, methods, means, elements and circuits that are well known to one skilled in the art are not described in detail, so as to highlight the principle of the present disclosure.

FIG. 1 is a flow chart of the method for categorizing a multimedia resource according to an embodiment of the present disclosure. The method may be applied in a server device configured to interact with one or more client devices. Referring to FIG. 1, the method comprises a step S101 of counting numbers of icons for respective types of icons input by a user on a client device for a multimedia resource presented on the client device, and a step S102 of determining a category to which the multimedia resource belongs according to the numbers of the respective types of icons input for the multimedia resource.

The multimedia may be a combination of multiple kinds of media, including multiple media forms of, for example, characters, sounds and images. For example, the multimedia resource may include, but is not necessarily limited to, video. The multimedia may be released from a server device to the client device for presentation. The server device releasing the multimedia may be a same device as or a different device from the above mentioned server device in which the method is applied (i.e. the server device categorizing the multimedia resource).

The server device in which the method is applied is configured to collect input from the one or more client devices associated with presentation of the multimedia on the client devices. The input indicates one or more icons. The respective types of icons input by the user for the multimedia resource may include, but are not necessarily limited to, comment icons or bullet-screen (real-time overlaying commentary subtitle) icons and the likes input by the user for the multimedia resource. The comment icons may be the icons input by the user in a comment area. The bullet-screen icons may be the icons input by the user in a bullet-screen area.

Figure 2:
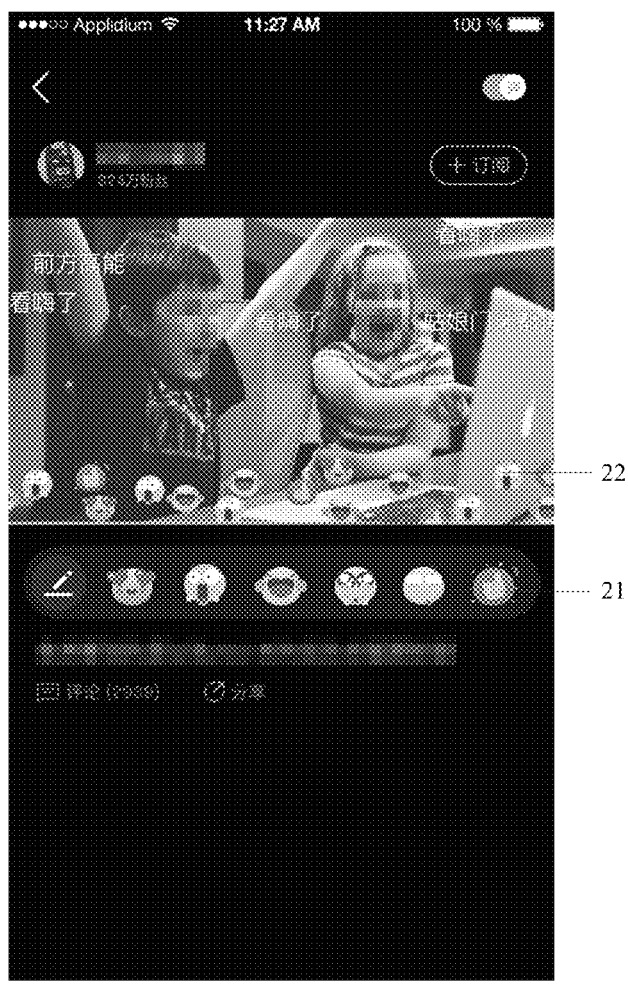
FIG. 2 is a schematic diagram of a video play interface in the method for categorizing multimedia resources according to an embodiment of the present disclosure.

FIG. 2 is a schematic diagram of a video play interface in the method for categorizing multimedia resources according to an embodiment of the present disclosure. Referring to FIG. 2, the area 21 may be an input area for bullet-screen icons, and the area 22 may be a display area for the bullet-screen icons. The area 22 for display of bullet-screen icons may, in some embodiments, overlap with a portion of a display area for the multimedia resource, such that at least some of the icons overlay at least a portion of a display of the multimedia resource, as shown in the example of FIG. 2. While FIG. 2 only shows 17 bullet-screen icons overlaying a frame of the video that is playing, there may be hundreds or thousands of bullet-screen icons that are displayed over the course of presentation of a particular video or other media resource (as in many of the examples described herein) because the bullet-screen icons are in motion as they are temporarily displayed (e.g., passing through, like a "bullet") in the area 22. The user may select and click on the bullet-screen icons in the area 21, having the selected bullet-screen icon displayed instantaneously in the area 22. The icons may be computer graphics representing the emotions of the user or the comment of the user on the multimedia resources. As shown in FIG. 2, the bullet-screen icons from the left to the right in the area 21 in sequence indicate the emotions of love, surprise, face with tears of joy, pity, boring and thumb up, etc. This embodiment does not limit the graphics of the bullet-screen icons, for example, the bullet-screen icon may also be an icon of laughter or facepalm. A comment area (not shown) for receiving input of comments and comment icons may be located in proximity to the video or on a separate screen that is accessible from the screen on which the video is being displayed, for example.

It should be noted that each type of icons may include multiple icons of different graphics but the same emotion; for example, icons representing the emotion of sorrow (i.e., an emotion identified by an emotion label of "sorrow") can include icons that have names associated with the emotion of sorrow (e.g., the icons having names of tears, cry, sadness and curling lips, etc.), and may be determined as one type. Also, each type of icon may include merely one icon; for example, the icon of sadness may be determined as one type of icon. Determining the emotion of the user from the icons input by the user for the multimedia resource is a relatively direct and accurate manner of matching if the icons themselves have already been associated with a predetermined emotion (e.g., an emotion corresponding to a name characterizing the icon). As a result, the determined emotion label, or categorization of the multimedia resource based on the emotion label, can be performed relatively accurately.

As an example of the present embodiment, the numbers of respective types of icons among all the bullet-screen icons input by all the users for the multimedia resource may be counted. Because the bullet-screen icons can represent the emotion of the user on the multimedia resource immediately and accurately, bullet-screen icons may be preferable for counting the numbers of respective types of icons input by the users for the multimedia resource.

As a further example of the present embodiment, the numbers of respective types of icons among a part (i.e., a subset of fewer than all) of the bullet-screen icons input by individual users for the multimedia resource within a first time period may be counted. The subset of the bullet-screen icons may include all the bullet-screen icons for which the input time is within the first time period. The server device in which the method is applied is further configured to store respective input times for at least some of the bullet-screen icons. The respective input times for the icons may correspond to times at which the icons temporarily overlay at least a portion of a display of the multimedia.

As a further example of the present embodiment, the numbers of respective types of icons among a part (i.e., a subset of fewer than all) of the comment icons and a subset of the bullet-screen icons input by individual users for the multimedia resource within a first time period may be counted. The subset of the comment icons may include all the comment icons for which the input time is within the first time period. The server device in which the method is applied is further configured to store respective input times for at least some of the comment icons.

It should be noted that, the first time period may be a time range with a start time and an end time. The first time period may start no earlier than a time of release of the multimedia resource and ends such that a subset of fewer than all icons input by all of the plurality of client devices have input times within the particular time period. For example, the first time period may be the three or six months before the current system time, and the like, which is not limited herein. The numbers of respective types of icons input by the user for the multimedia resource within the first time period is counted, to make the statistical result be more representative, thereby improving the accuracy of the categorization of the multimedia resource.

Each type of icons may have a correspondence with some category of the multimedia resources. For example, the icons representing the emotion of love may have a correspondence with the category of affection; the icons representing the emotion of surprise may have a correspondence with the category of horror; the icons representing the emotion of face with tears of joy may have a correspondence with the category of comedy; and the icons representing the emotion of pity may have a correspondence with the category of tragedy, and so on.

As an example of the present embodiment, a category to which the multimedia resource belongs may be determined according to the numbers of each type of icons input for the multimedia resource. The determined category can then be associated with that multimedia resource, for example, by including that multimedia resource in a ranking list for the determined category, or other category information.

As a further example of the present embodiment, multiple categories to which the multimedia resource belongs may be determined according to the numbers of each type of icons input for the multimedia resource. The determined categories can then be associated with that multimedia resource, for example, by including that multimedia resource in different respective ranking lists for each of the determined categories, or other category information.

It should be noted that a certain multimedia resource may belong to multiple categories; and in different categories, a ranking of the multimedia resource within each category may vary. For example, if for a certain multimedia resource, the number of the bullet-screen icon of face with tears of joy is 1000, and the number of the bullet-screen icon of surprise is 500, then the multimedia resource may rank at a first ranking position (e.g., within a ranking list) in the category of comedy and at a fourth ranking position in the category of horror.

This embodiment does not limit the manner of display for the multimedia resources. For example, at least one category may be displayed; after the user clicks into the category, information of multiple multimedia resources belonging to the category may be displayed. The user can click on the information to view the details of a multimedia resource, or click a "More" control corresponding to the category to view other categories. The information of the multimedia resources may include the title, labels, posters and the likes thereof.

For a further example, the ranking list of at least one category may be displayed, on a client device, and information for multiple multimedia resources belonging to the category may be displayed, on the client device, in the ranking list. The user may click on the information to view the details of the multimedia resource, or click the "More" control corresponding to the ranking list of the category to view the ranking lists of other categories. The present embodiment does not limit the manner of determining the ranking list. For example, the multimedia resources belonging to the category may be displayed randomly in the ranking list. For a further example, the ranking list may be determined according to the numbers of the icons corresponding to the category and input for respective multimedia resources belonging to the category. A variety of other information characterizing a set of multimedia resources can be sent from the server device to one or more of the client devices, where the information characterizing the multimedia resources is based at least in part on one or more categories that have been determined and associated with the multimedia resources.

Further, the user may, for example, click on the information to view the details of the multimedia resource, and may click on the "More" control corresponding to the multimedia resource to view one or more of the respective types of icons input for the multimedia resource, the numbers of the respective types of icons, and the ranking of the multimedia resource with regard to the respective types of icons. For example, when the "More" control in a video A of the category of comedy is clicked on, respective types of icons input for the video A, such as the bullet-screen icon of face with tears of joy and the bullet-screen icon of surprise, may be displayed; the numbers of the respective types of icons input for the video A may also be displayed, e.g., the number of the bullet-screen icon of face with tears of joy is 1000, and the number of the bullet-screen icon of surprise is 500; the ranking of video A under the respective types of icons may also be displayed, e.g., video A is ranked at the first in the category of comedy corresponding to the bullet-screen icon of face with tears of joy, and at the fourth in the category of horror corresponding to the bullet-screen icon of surprise.

It should be noted that, one skilled in the art should understand that the examples described herein are some possible embodiments of the methods for categorizing multimedia resources to determine the category to which the multimedia resource belongs according to the numbers of the respective types of icons input for the multimedia resource. Also, the numbers of the respective types of icons input for the multimedia resource may be taken as a reference, and the above method could be combined with other methods for categorizing multimedia resources in the relative arts to determine the category to which the multimedia resource belongs.

In the method for categorizing multimedia resources according to the embodiment, respective types of icons input by the user for the multimedia resource can be taken into consideration when categorizing the multimedia resources, thereby improving the accuracy of the multimedia resource categorization.

Figure 3:
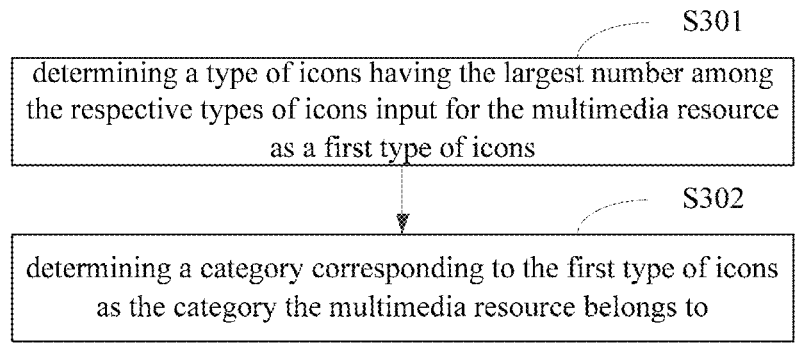
FIG. 3 is an exemplary flow chart of step S102 in the method for categorizing multimedia resources according to an embodiment of the present disclosure.

FIG. 3 is an exemplary flow chart of step S102 in the method for categorizing multimedia resources according to an embodiment of the present disclosure. As shown in FIG. 3, determining the category to which the multimedia resource belongs according to the numbers of the respective types of icons input for the multimedia resource includes:

a step S301 of determining a type of icons having the largest number among the respective types of icons input for the multimedia resource as a first type of icons; and a step S302 of determining a category corresponding to the first type of icons as the category to which the multimedia resource belongs.

For example, the numbers of respective types of icons among all the bullet-screen icons input by the respective users for the video A are counted, obtaining 600 bullet-screen icons of face with tears of joy, 70 bullet-screen icons of boring and 200 bullet-screen icons of surprise. Then, the bullet-screen icon of face with tears of joy can be determined as the first type of icons, and the category of comedy corresponding to the bullet-screen icon of face with tears of joy is determined as the category to which the video A belongs.

Figure 4:
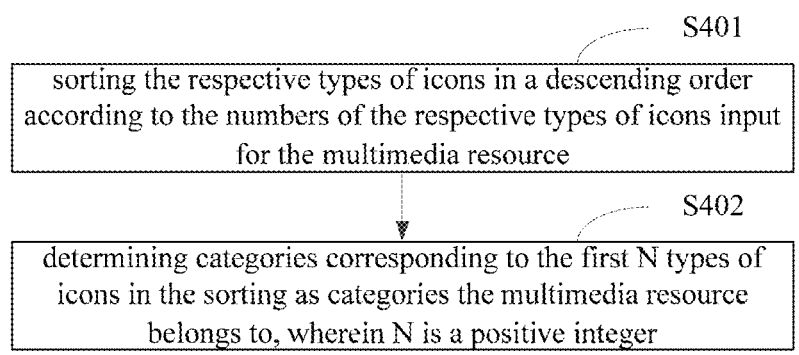
FIG. 4 is a further exemplary flow chart of step S102 in the method for categorizing multimedia resources according to an embodiment of the present disclosure.

FIG. 4 is a further exemplary flow chart of step S102 in the method for categorizing multimedia resources according to an embodiment of the present disclosure. As shown in FIG. 4, determining the category to which the multimedia resource belongs according to the numbers of the respective types of icons input for the multimedia resource includes:

a step S401 of sorting the respective types of icons in a descending order according to the numbers of the respective types of icons input for the multimedia resource; and a step S402 of determining categories corresponding to the first N types of icons in the sorting as categories to which the multimedia resource belongs, wherein N is a positive integer.

For example, the numbers of the respective types of icons among all the bullet-screen icons input by respective users for the video A are counted, obtaining 600 bullet-screen icons of face with tears of joy, 70 bullet-screen icons of boring and 200 bullet-screen icons of surprise. Then, the respective types of icons may be sorted in a descending order according to the numbers of the respective types of icons input for the video A, and the result of sorting will be: the bullet-screen icon of face with tears of joy, the bullet-screen icon of surprise, and the bullet-screen icon of boring. The category of comedy corresponding to the bullet-screen icon of face with tears of joy and the category of horror corresponding to the bullet-screen icon of surprise, i.e. the first two in the sorting, are determined as the categories to which the video A belongs.

In one possible implementation, determining the category to which the multimedia resource belongs according to the numbers of the respective types of icons input for the multimedia resource includes: sorting the respective types of icons in an ascending order according to the numbers of the respective types of icons input for the multimedia resource; and determining the categories corresponding to the last N types of icons in the sorting as the categories to which the multimedia resource belongs, wherein N is a positive integer.

For example, the numbers of the respective types of icons among all the bullet-screen icons input by respective users for the video A are counted, obtaining 600 bullet-screen icons of face with tears of joy, 70 bullet-screen icons of boring and 200 bullet-screen icons of surprise. Then, the respective types of icons may be sorted in an ascending order according to the numbers of the respective types of icons input for the video A, and the result of sorting will be: the bullet-screen icon of boring, the bullet-screen icon of surprise, and the bullet-screen icon of face with tears of joy. The category of horror corresponding to the bullet-screen icon of surprise and the category of comedy corresponding to the bullet-screen icon of face with tears of joy, i.e. the last two in the sorting, are determined as the categories to which the video A belongs.

It should be noted that, one skilled in the art should understand that there are multiple manners to determine the value of N. For example, but without making any limit, the value of N may be a predetermined value, or can be determined according to the number of types of the respective types of icons input for the multimedia resources.

In one possible implementation, determining the value of N according to the number of types of the respective types of icons input for the multimedia resource may include: determining a difference between the number of types of the respective types of icons input for the multimedia resource and a first value as the value of N, wherein the first value is smaller than the number of types of the respective types of icons input for the multimedia resource.

For example, by counting the respective types of icons input by the user for video B, there are obtained the bullet-screen icons of face with tears of joy, boring, surprise and love. Thus, the number of types of the respective types of icons input for video B is 4. If the first value is 2, the value of N can be determined as 2, which is the difference between the number of types 4 and the first value 2.

Figure 5:
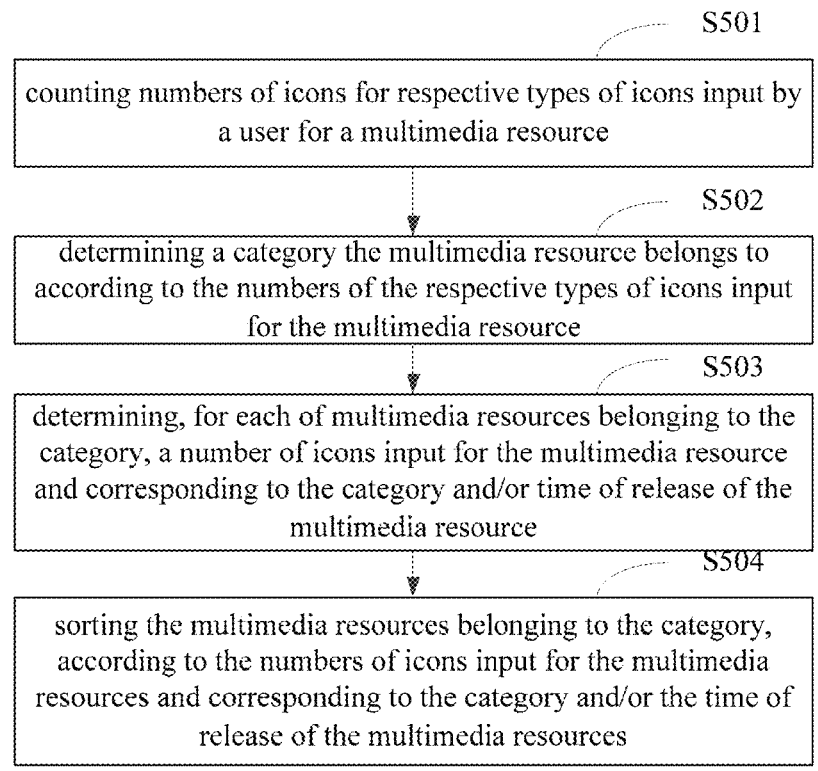
FIG. 5 is an exemplary flow chart of the method for categorizing multimedia resources according to an embodiment of the present disclosure.

FIG. 5 is an exemplary flow chart of the method for categorizing multimedia resources according to an embodiment of the present disclosure. As shown in FIG. 5, the method comprises:

a step S501 of counting numbers of icons for respective types of icons input by a user for a multimedia resource;

a step S502 of determining a category to which the multimedia resource belongs according to the numbers of the respective types of icons input for the multimedia resource;

a step S503 of determining, for each of multimedia resources belonging to the category, a number of icons input for the multimedia resource and corresponding to the category and/or time of release of the multimedia resource; and a step S504 of sorting the multimedia resources belonging to the category, according to the numbers of icons input for the multimedia resources and corresponding to the category and/or the time of release of the multimedia resources.

In one possible implementation, the respective multimedia resources belonging to some category are sorted according to the numbers of icons input for the respective multimedia resources and corresponding to the category.

As one example of this implementation, the respective multimedia resources belonging to some category are sorted in a descending order according to the numbers of icons input for the respective multimedia resources and corresponding to the category. Wherein the icons corresponding to the category may be the icons that have correspondence with the category. For example, the icons corresponding to the category of comedy may be a bullet-screen icon of face with tears of joy.

For example, the number of the bullet-screen icon of face with tears of joy input for the respective videos belonging to the category of comedy, i.e. videos A, B and C, are counted, obtaining 600 bullet-screen icons of face with tears of joy input for video A, 1000 input for video B and 200 input for video C. Then, the respective videos can be sorted in a descending order according to the numbers of the bullet-screen icon of face with tears of joy input for the respective videos in the category of comedy, and the result of sorting will be: video B, video A and video C. After having the sorting result obtained, the information of video B, video A and video C may be displayed in a descending sequence in the ranking list of the category of comedy. The information of video may include a title, labels or posters thereof.

In one possible implementation, the respective multimedia resources belonging to some category are sorted according to the time of release of the respective multimedia resources.

As one example of this implementation, the respective multimedia resources belonging to some category are sorted in an order from the latest to the earliest according to the time of release of the respective multimedia resources.

For example, assuming that the category of comedy includes videos A, B, C, D and E, and the time of release of video A is Jan. 25, 2017, and that of video B is Feb. 22, 2017, video C Nov. 8, 2016, video D Dec. 8, 2016, and video E Oct. 8, 2016. Then, the videos may be sorted in an order from the latest to the earliest according to the time of release of the respective videos, and the result of sorting will be: video B, video A, video D, video C, video E. After having the sorting result obtained, the information of video B, video A and video D may be displayed in a descending sequence in the ranking list of the category of comedy.

In one possible implementation, the respective multimedia resources belonging to some category are sorted according to the numbers of the icons input for the respective multimedia resources and corresponding to the category and the time of release of the respective multimedia resources.

As one example of this implementation, sorting the respective multimedia resources belonging to some category according to the numbers of the icons input for the respective multimedia resources and corresponding to the category and the time of release of the respective multimedia resources may include: determining scores of the respective multimedia resources according to the numbers of the icons input for respective multimedia resources and corresponding to the category and the time of release of the respective multimedia resources; and sorting the respective multimedia resources in a descending order according to the scores of the respective multimedia resources.

The following Equation 1 is applied to determine the score $S_i$ of the ith multimedia resource.

$$S_i = Q_{1i}C_{1i} + Q_{2i}C_{2i} \qquad \text{Equation 1}$$

Wherein, $Q_{1i}$ indicates the weight corresponding to the number of icons input for the ith multimedia resource and corresponding to the category, $C_{1i}$ indicates the number of icons input for the ith multimedia resource and corresponding to the category, $Q_{2i}$ indicates a weight corresponding to the time of release of the ith multimedia resource, and $C_{2i}$ indicates a value corresponding to the time of release of the ith multimedia resource. The value corresponding to the time of release may be determined according to the difference between the time of release and the current system time. The value corresponding to the time of release may negatively correlate to the difference; that is, the smaller the difference is, the larger the value corresponding to the time of release will be, and the larger the difference is, the smaller the value corresponding to the time of release will be.

As one example of this implementation, sorting the respective multimedia resources belonging to some category according to the numbers of the icons input for respective multimedia resources and corresponding to the category and the time of release of the respective multimedia resources may include: sorting the respective multimedia resources in a descending order according to the numbers of the icons input for the respective multimedia resources and corresponding to the category; selecting the first M multimedia resources in the sorting, wherein M is a positive integer; and sorting the M multimedia resources in an order from the latest to the earliest according to the time of release.

For example, the numbers of the bullet-screen icon of face with tears of joy input for the respective videos in the category of comedy, i.e. videos A, B, C, D and E, are counted, obtaining 600 bullet-screen icons of face with tears of joy input for video A, 1000 input for video B, 200 input for video C, 400 input for video D and 800 input for video E. Then, the videos may be sorted in a descending order according to the numbers of the bullet-screen icon of face with tears of joy input for the respective videos in the category of comedy, and the result of sorting will be: video B, video E, video A, video D, and video C. The top three videos, i.e., Video B, Video E, and Video A, are selected. Assuming that the time of release of video B is Feb. 22, 2017, that of video E is Oct. 8, 2016, and that of video A is Jan. 25, 2017. Then, the three videos B, E and A may be sorted in an order from the latest to the earliest according to the time of release of the respective videos, and the result of sorting will be: video B, video A, video E. After having the sorting result obtained, the information of video B, video A and video E may be displayed in a descending sequence in the ranking list of the category of comedy.

According to the method for categorizing multimedia resources according to this embodiment, respective types of icons input by the users for multimedia resources and the time of release of the multimedia resources can be taken into consideration in categorizing the multimedia resources, so as to rank the latest released multimedia resource at the top, thereby improving the accuracy of the categorization of the multimedia resources.

Figure 6:
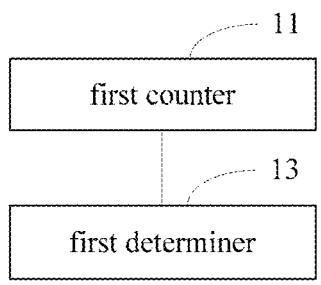
FIG. 6 is a block diagram of the device for categorizing multimedia resources according to an embodiment of the present disclosure.

FIG. 6 is a block diagram of the server device for categorizing multimedia resources according to an embodiment of the present disclosure. As shown in FIG. 6, the device comprises: a first counter 11 for counting the numbers of the respective types of icons input by the user for a multimedia resource; and a first determiner 13 for determining the category to which the multimedia resource belongs according to the numbers of the respective types of icons input for the multimedia resource. Although not shown, the device further comprises an input interface for collecting input from one or more of the plurality of client devices associated with presentation of the multimedia resource on the client devices, and the input indicates one or more icons.

In one possible implementation, the device further comprises storage for storing respective input times for at least some of the icons, and the first counter 11 is configured to count numbers of icons for respective types of icons included in the collected input having input times within a particular time period, where the particular time period starts no earlier than a time of release of the multimedia resource and ends such that a subset of fewer than all icons input by all of the plurality of client devices have input times within the particular time period.

In one possible implementation, the device further comprises circuitry for transmitting information characterizing a plurality of multimedia resources from the server device to one or more of the client devices, where the information characterizing the plurality of multimedia resources is based at least in part on one or more categories represented in respective category information associated with the plurality of multimedia resources.

Figure 7:
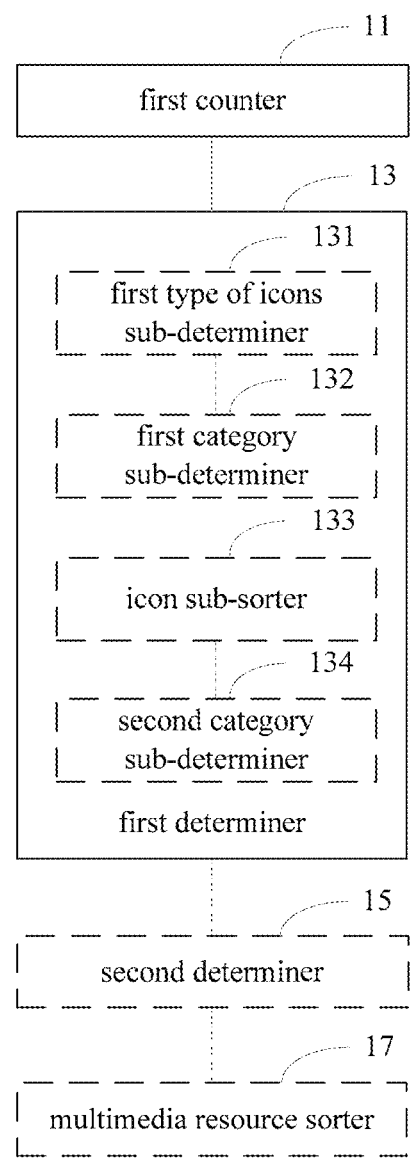
FIG. 7 is an exemplary block diagram of the device for categorizing multimedia resources according to an embodiment of the present disclosure.

FIG. 7 is an exemplary block diagram of the server device for categorizing multimedia resources according to an embodiment of the present disclosure. As shown in FIG. 7, in one possible implementation, the first determiner 13 includes: a first type of icons sub-determiner 131 for determining a type of icons having largest number among the respective types of icons input for the multimedia resource as the first type of icons; and a first category sub-determiner 132 for determining the category corresponding to the first type of icons as the category to which the multimedia resource belongs.

In one possible implementation, the first determiner 13 includes: an icon sub-sorter 133 for sorting the respective types of icons in a descending order according to the numbers of the respective types of icons input for the multimedia resource; and a second category sub-determiner 134 for determining the categories corresponding to the first N types of icons in the sorting as the categories to which the multimedia resource belongs, wherein N is a positive integer.

In one possible implementation, the device further comprises: a second determiner 15 for determining, for each of multimedia resources belonging to the category, a number of icons input for the multimedia resource and corresponding to the category and/or time of release of the multimedia resource; and a multimedia resource sorter 17 for sorting the multimedia resources belonging to the category, according to the numbers of icons input for the multimedia resources and corresponding to the category and/or the time of release of the multimedia resources.

The device for categorizing multimedia resources according to this embodiment can take the respective types of icons input by the user for the multimedia resources into consideration when categorizing the multimedia resources, thereby improving the accuracy of the categorization of the multimedia resources.

Figure 8:
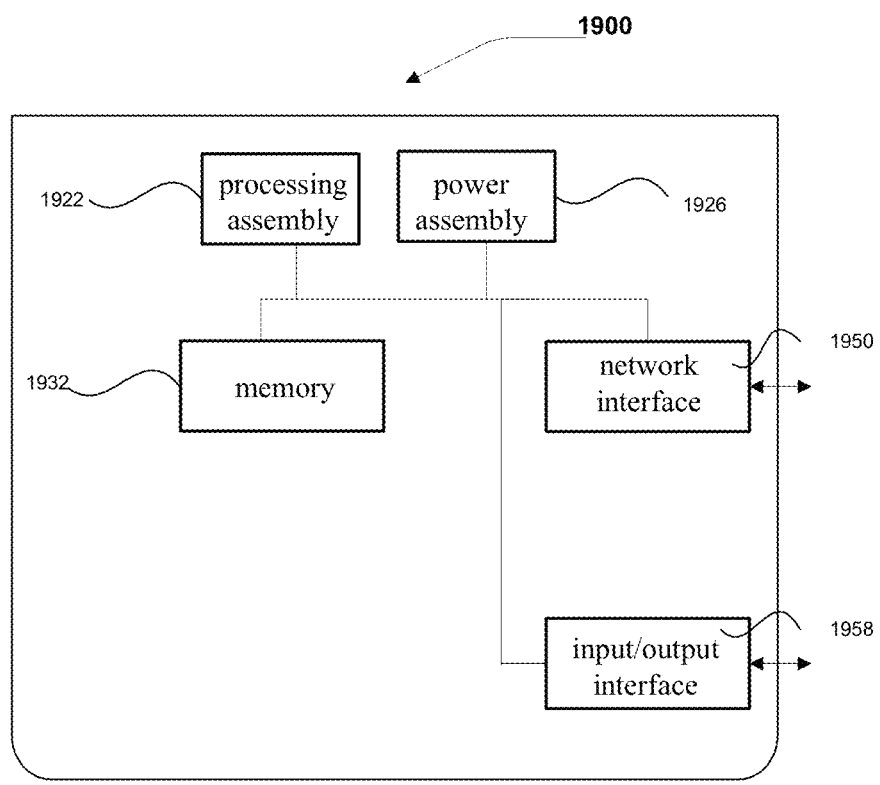
FIG. 8 is a block diagram of the device 1900 for categorizing multimedia resources according to one exemplary embodiment of the present disclosure.

FIG. 8 is a block diagram of a device 1900 for categorizing multimedia resources according to one exemplary embodiment of the present disclosure. For example, the device 1900 may be provided as a server. Referring to FIG. 8, the device 1900 comprises a processing assembly 1922 that further includes one or more processors; and a memory resources represented by a memory 1932 for storing instructions, such as applications, executable by the processing assembly 1922. The applications stored in memory 1932 may include one or more modules, each corresponding to a set of instructions. In addition, the processing assembly 1922 is configured to execute instructions to perform the above method.

The device 1900 may further include: a power assembly 1926 configured to perform power management on the device 1900; a wired or wireless network interface 1950 configured to connect the device 1900 to a network; and an input/output (I/O) interface 1958. The device 1900 may be operated on the basis of an operating system stored in the memory 1932, such as Windows Server™, Mac OS X™, Unix™, Linux™, FreeBSD™, and the likes.

In an exemplary embodiment, there is also provided a non-transitory computer readable storage medium, such as the memory 1932, that comprises instructions; the instructions may be executed by the processing assembly 1922 of the device 1900 for performing the above methods.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may include, but is not necessarily limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

The invention claimed is:

1. A method for categorizing a multimedia resource, comprising:
    collecting input from one or more of a plurality of client devices associated with presentation of the multimedia resource on the client devices, the input indicating one or more icons, where each icon is associated with a corresponding type;
    counting numbers of icons for respective types of icons;
    determining, at a server device, a category to which the multimedia resource belongs according to the numbers of the respective types of icons input for the multimedia resource; and
    associating category information representing the determined category with the multimedia resource,
    wherein determining the category to which the multimedia resource belongs according to the numbers of the respective types of icons input for the multimedia resource comprises:
        sorting the respective types of icons in a descending order according to the numbers of the respective types of icons input for the multimedia resource, and
        determining categories corresponding to the first N types of icons in the sorting as categories to which the multimedia resource belongs, wherein N is a positive integer.

2. The method according to claim 1, wherein the method further comprises storing respective input times for at least some of the icons, and
    counting numbers of icons for respective types of icons comprises counting numbers of icons for respective types of icons included in the collected input having input times within a particular time period, where the particular time period starts no earlier than a time of release of the multimedia resource and ends such that a subset of fewer than all icons input by all of the plurality of client devices have input times within the particular time period.

3. The method according to claim 2, wherein the respective input times for at least some of the icons correspond to times at which at least some of the icons temporarily overlay at least a portion of a display of the multimedia resource.

4. The method according to claim 1, wherein the method further comprises transmitting information characterizing a plurality of multimedia resources from the server device to one or more of the client devices, where the information characterizing the plurality of multimedia resources is based at least in part on one or more categories represented in respective category information associated with the plurality of multimedia resources.

5. The method according to claim 1, wherein the value of N is determined according to the number of types of the respective types of icons input for the multimedia resource.

6. The method according to claim 1, wherein the method further comprises:
    determining, for each of multimedia resources belonging to the category, a number of icons input for the multimedia resource and corresponding to the category and/or the time of release of the multimedia resource;
    sorting the multimedia resources belonging to the category, according to the numbers of icons input for the multimedia resources and corresponding to the category and/or the time of release of the multimedia resources.

7. The method according to claim 6, wherein sorting the multimedia resources belonging to the category, according to the numbers of icons input for the multimedia resources and corresponding to the category and/or the time of release of the multimedia resources comprises:
    determining scores of the multimedia resources according to the numbers of the icons input for the multimedia resources and corresponding to the category and the time of release of the multimedia resources; and
    sorting the respective multimedia resources according to the scores of the respective multimedia resources.

8. The method according to claim 7, wherein the scores of the multimedia resources are determined by the following equation, $$S_i = Q_{1i}C_{1i} + Q_{2i}C_{2i}$$

wherein, $S_i$ indicates the score of the ith multimedia resource, $Q_{1i}$ indicates the weight corresponding to the number of icons input for the ith multimedia resource and corresponding to the category, $C_{1i}$ indicates the number of icons input for the ith multimedia resource and corresponding to the category, $Q_{2i}$ indicates a weight corresponding to the time of release of the ith multimedia resource, and $C_{2i}$ indicates a value corresponding to the time of release of the ith multimedia resource.

9. The method according to claim 6, wherein sorting the multimedia resources belonging to the category, according to the numbers of icons input for the multimedia resources and corresponding to the category and/or the time of release of the multimedia resources comprises:
sorting the multimedia resources in a descending order according to the numbers of the icons input for the multimedia resources and corresponding to the category;
selecting the first M multimedia resources in the sorting, wherein M is a positive integer; and
sorting the M multimedia resources in an order from the latest to the earliest according to the time of release.

10. A server device for categorizing a multimedia resource, comprising:
an input interface of the server device for collecting input from one or more of a plurality of client devices associated with presentation of the multimedia resource on the client devices, the input indicating one or more icons, where each icon is associated with a corresponding type;
a first counter configured to count numbers of icons for respective types of icons;
a first determiner configured to determine a category to which the multimedia resource belongs according to the numbers of the respective types of icons input for the multimedia resource; and
circuitry for associating category information representing the determined category with the multimedia resource,
wherein the first determiner comprises:
an icon sub-sorter configured to sort the respective types of icons in a descending order according to the numbers of the respective types of icons input for the multimedia resource; and
a second category sub-determiner configured to determine categories corresponding to the first N types of icons in the sorting as categories to which the multimedia resource belongs, wherein N is a positive integer.

11. The server device according to claim 10, wherein the server device further comprises storage for storing respective input times for at least some of the icons, and
the first counter is configured to count numbers of icons for respective types of icons included in the collected input having input times within a particular time period, where the particular time period starts no earlier than a time of release of the multimedia resource and ends such that a subset of fewer than all icons input by all of the plurality of client devices have input times within the particular time period.

12. The server device according to claim 11, wherein the respective input times for at least some of the icons correspond to times at which at least some of the icons temporarily overlay at least a portion of a display of the multimedia resource.

13. The server device according to claim 10, wherein the server device further comprises circuitry for transmitting information characterizing a plurality of multimedia resources from the server device to one or more of the client devices, where the information characterizing the plurality of multimedia resources is based at least in part on one or more categories represented in respective category information associated with the plurality of multimedia resources.

14. The server device according to claim 10, wherein the value of N is determined according to the number of types of the respective types of icons input for the multimedia resource.

15. The server device according to claim 10, wherein the device further comprises:
a second determiner configured to determine, for each of multimedia resources belonging to the category, a number of icons input for the multimedia resource and corresponding to the category and/or time of release of the multimedia resource; and
a multimedia resource sorter configured to sort the multimedia resources belonging to the category, according to the numbers of icons input for the multimedia resources and corresponding to the category and/or the time of release of the multimedia resources.

16. The server device according to claim 15, wherein the multimedia resource sorter is configured to determine scores of the multimedia resources according to the numbers of the icons input for the multimedia resources and corresponding to the category and the time of release of the multimedia resources, and sort the respective multimedia resources according to the scores of the respective multimedia resources.

17. The server device according to claim 16, wherein the multimedia resource sorter is configured to determine the scores of the multimedia resources by the following equation, $$S_i = Q_{1i}C_{1i} + Q_{2i}C_{2i}$$

wherein, $S_i$ indicates the score of the ith multimedia resource, $Q_{1i}$ indicates the weight corresponding to the number of icons input for the ith multimedia resource and corresponding to the category, $C_{1i}$ indicates the number of icons input for the ith multimedia resource and corresponding to the category, $Q_{2i}$ indicates a weight corresponding to the time of release of the ith multimedia resource, and $C_{2i}$ indicates a value corresponding to the time of release of the ith multimedia resource.

18. The server device according to claim 15, wherein the multimedia resource sorter is configured to sort the multimedia resources in a descending order according to the numbers of the icons input for the multimedia resources and corresponding to the category, select the first M multimedia resources in the sorting, and sort the M multimedia resources in an order from the latest to the earliest according to the time of release, wherein M is a positive integer.

19. A server device for categorizing a multimedia resource, comprising:
a processor;
a memory storing computer-readable instructions that, when executed by the processor, cause the processor to:
collect input from one or more of a plurality of client devices associated with presentation of the multimedia resource on the client devices, the input indicating one or more icons, where each icon is associated with a corresponding type;
count numbers of icons for respective types of icons;
determine a category to which the multimedia resource belongs according to the numbers of the respective types of icons input for the multimedia resource; and
associate category information representing the determined category with the multimedia resource,
wherein determining the category to which the multimedia resource belongs according to the numbers of the respective types of icons input for the multimedia resource comprises:

sorting the respective types of icons in a descending order according to the numbers of the respective types of icons input for the multimedia resource, and
determining categories corresponding to the first N types of icons in the sorting as categories to which the multimedia resource belongs, wherein N is a positive integer.

* * * * *